United States Patent [19]

Ona et al.

[11] 4,399,247
[45] Aug. 16, 1983

[54] ORGANOPOLYSILOXANE-CONTAINING COMPOSITION FOR TREATING SUBSTRATES

[75] Inventors: Isao Ona, Sodegaura; Masaru Ozaki, Ichihara; Katsutoshi Usui, Ichihara; Yoichiro Taki, Ichihara, all of Japan

[73] Assignee: Toray Silicone Company, Ltd., Tokyo, Japan

[21] Appl. No.: 389,301

[22] Filed: Jun. 17, 1982

[30] Foreign Application Priority Data

Jun. 26, 1981 [JP] Japan ................................. 56-99453

[51] Int. Cl.³ .......................... C08K 5/04; C08K 5/09; C08K 5/16; D06M 13/18
[52] U.S. Cl. .................................. 524/204; 524/398; 524/399; 252/8.8
[58] Field of Search ................. 252/8.8; 524/204, 398, 524/399

[56] References Cited

U.S. PATENT DOCUMENTS

| 2,928,798 | 3/1960 | Brown et al. | 524/398 |
| 2,928,799 | 3/1960 | Brown | 524/398 |
| 3,388,089 | 6/1968 | Brown | 524/398 |
| 3,466,178 | 9/1969 | Enders et al. | 252/8.6 |
| 3,926,896 | 12/1975 | Dumoulin | 524/398 |

*Primary Examiner*—Maria Parrish Tungol
*Attorney, Agent, or Firm*—George A. Grindahl

[57] ABSTRACT

Aqueous organopolysiloxane compositions are disclosed which are useful for durably treating substrates such as fibers, textiles and sheet-form materials. The aqueous organopolysiloxane compositions further contain an acid to adjust the pH of the composition to a non-basic value, an organic ester of titanic, zirconic or germanic acid and a surfactant to render the composition homogeneous. The organopolysiloxane contains monovalent hydrocarbon groups, aminohydrocarbon groups, hydroxy- or ether hydrocarbon groups and, optionally silicon-bonded hydroxyl and/or alkoxy groups.

6 Claims, No Drawings

ORGANOPOLYSILOXANE-CONTAINING COMPOSITION FOR TREATING SUBSTRATES

BACKGROUND OF THE INVENTION

The present invention concerns an aqueous organopolysiloxane composition. More precisely, it concerns an aqueous organopolysiloxane composition used to treat various base materials, particularly fibers, textiles and sheet-form base materials, whereby the organopolysiloxane is effectively adsorbed onto the base material and imparts to it a durable crease resistance, softness, elasticity, etc., without harming its antistatic properties and stain resistance.

In the past, compositions composed of various polysiloxanes have been provided or proposed for the purpose of giving crease resistance, softness, elasticity, water repellency, etc., to fibers, textiles and sheet-form base materials.

For example, dimethylpolysiloxane oil and emulsions thereof are known to produce softness. A composition composed of methyl hydrogen polysiloxane, hydroxyl-endblocked dimethylpolysiloxane, and a condensation reaction catalyst, or a composition composed of methyl hydrogen polysiloxane and vinyl-containing diorganopolysiloxane and an addition reaction catalyst are known to impart durable softness, crease resistance, and elasticity.

More particularly, a composition composed of an organopolysiloxane with at least two epoxy groups in each molecule and an organopolysiloxane containing amino groups for the purpose of making synthetic organic fibers smooth has been proposed in Japanese Patent Sho 48[1973]-17514. A composition composed of an hydroxyl-endblocked diorganopolysiloxane and an organosilane having amino and alkoxy groups in each molecule, and/or partially hydrolyzed products and condensation products thereof, has been proposed in Japanese Patent Sho 53[1978]-36079. A composition composed of an aminoalkyltrialkoxysilane and an organopolysiloxane containing epoxy groups has been proposed in Japanese Patents Sho 53[1978]-19715 and Sho 53[1978]-19716. A diorganopolysiloxane with both ends blocked with triorganosiloxy groups which contain two or more aminoalkyl groups in each molecule has been proposed in Japanese Patent Sho 53[1978]-98499.

However, these conventionally well-known compositions have some major drawbacks in common. Those drawbacks are that the conventional compositions have a low adsorptivity toward various base materials, merely adhering onto the surface of the fiber or sheet-form base material or simply forming a hard coat thereon. Thus, the bonding strength with the fiber, textile or sheet-form base material is weak, and even if it is said to be durable, it is gradually worn away due to friction and repeated laundering, so there are limits to that durability. Furthermore, although the crease resistance, softness, and elasticity are improved, the base material easily becomes electrically charged and easily stained.

BRIEF SUMMARY OF THE INVENTION

It is an object of the present invention to provide improved organopolysiloxane compositions for treating various base materials. It is a further object of the present invention to provide an organopolysiloxane composition which is free of one or more of the above-listed drawbacks of the conventionally known compositions.

As a result of intensive research to eliminate the drawbacks of conventionally well-known fiber-treating compositions, such as those described above, the present inventors have developed an organopolysiloxane composition which is extremely useful in the treatment of various base materials, particularly fibers, textiles and sheet-form base materials, because the organopolysiloxane employed is strongly adsorbed onto the fiber, textile and sheet-form base material and can impart a durable crease resistance, softness, and elasticity without harming its antistatic properties and stain resistance.

These objects, and others which will become apparent upon considering the following disclosure and claims, are obtained by preparing a composition which comprises an organopolysiloxane component having certain amine-containing hydrocarbon groups and certain oxygen-containing groups, in addition to hydrocarbon groups and optional hydroxyl or alkoxy groups; one or more surfactants, when needed; certain catalysts; an acid and water.

DETAILED DESCRIPTION OF THE INVENTION

The present invention relates to a composition obtained by mixing components comprising (A) 100 parts by weight of an organopolysiloxane component having the formula $R_aX_bY_cZ_dSiO_{(4-a-b-c-d)/2}$ wherein R denotes a monovalent hydrocarbon group; X denotes a group having the formula $-R^1(NHCH_2CH_2)_eNR_2^2$, wherein $R^1$ denotes a divalent hydrocarbon group, $R^2$ denotes a hydrogen atom or a monovalent hydrocarbon group and e is an integer from 0 to 3; Y denotes a group having the formula $-R^3OH$ or $-R_f^3O(C_mH_{2m}O)_gR^4$ wherein $R^3$ denotes a divalent hydrocarbon group, $R^4$ denotes a hydrogen atom or a terminating group, f is 0 or 1, g has a value of from 1 to 100 and m is an integer from 1 to 5; Z denotes a hydroxyl group or an alkoxy group; a has a value of from 1.90 to 2.20; b has a value of from 0.0001 to 0.2; c has a value of from 0.0001 to 0.2; d has a value of from 0 to 0.2 and the sum $a+b+c+d$ has a value of from about 1.90 to 2.20; (B) 0 to 100 parts by weight of a nonionic or a cationic surfactant; (C) 0.2 to 50 parts by weight of an organic ester of titanic zirconic or germanic acid; (D) an amount of acid sufficient to provide a pH of from 2.5 to 7.0 for the composition and (E) an amount of water effective to emulsify or dissolve component (A).

The organopolysiloxane component (A) is the primary component of the composition of the present invention.

R in the above formula for component (A) denotes a monovalent hydrocarbon group, such as alkyl groups such as methyl, ethyl, propyl, octyl and dodecyl; alkenyl groups such as a vinyl and allyl; aryl groups such as a phenyl, 2-phenylethyl and tolyl; cycloalkyl groups such as a cyclohexyl and cycloheptyl; or a substituted form thereof such as 3,3,3-trifluoropropyl, 3-chloropropyl group, and 2-methyl-3-chloropropyl. However, the substituted R group does not contain a substituent contained in the X and Y groups, hereinbelow delineated. It is not necessary that all the R's in each molecule be identical, but it is desirable that at least 50 mol% be methyl groups. The R group is present in (A) in an average range of from 1.90 to 2.20 groups per silicon atom.

X in the above formula for component (A) denotes a group expressed by the formula —R$^1$(NHCH$_2$CH$_2$)$_e$NR$_2^2$. R$^1$ is a divalent hydrocarbon group such as an alkylene group such as a methylene, ethylene, propylene, butylene and —CH$_2$CH(CH$_3$)CH$_2$— group; and an alkylene aryl group such as —(CH$_2$)$_2$C$_6$H$_4$— and the phenylene group. Among these, the alkylene group, particularly the propylene group, is preferred. R$^2$ denotes a hydrogen atom or monovalent hydrocarbon group, and the latter is represented by methyl, ethyl, propyl, hexyl, and phenyl groups. Both R$^2$ substituents may be hydrogen atoms or monovalent hydrocarbon groups, or one may be a hydrogen atom and the other a monovalent hydrocarbon group. The symbol e represents 0, 1, 2, or 3, but is preferably 0 or 1. The X group is present in (A) in an average range of from 0.0001 to 0.2 groups per silicon atom, but when the composition of the present invention is used in the treatment of fibers, an average of 0.001 to 0.05 is preferred. The reason for this is that when too few X groups are present, the adsorptivity for the fibers decreases, and when it is excessive, discoloration increases.

Y in the above formula for component (A) denotes a group having the formula —R$^3$OH or —(R$^3$)$_f$—O—(C$_m$H$_{2m}$O)$_g$R$^4$. The divalent hydrocarbon groups R$^3$ are presented by the same examples given for R$^1$. Among these, the alkylene group, particularly the propylene group, is preferred. R$^4$ is a hydrogen atom or a terminating group. The terminating group is represented by a monovalent hydrocarbon group, an acyl group, or a carbonic acid monoester, with the monovalent hydrocarbon group corresponding to those examples as given for R. The acyl group is represented by an acetyl, propionyl, and benzoyl group. The letter f represents 0 or 1, but is preferably 1; m is an integer from 1 to 5, but is preferably 2 or 3; and g is an integer of 1 to 100, but is preferably an integer of from 3 to 70. The Y group is present in (A) in an average range of from 0.0001 to 0.2 groups per silicon atom, but an average of 0.001 to 0.1 is preferred. This is a consequence of the fact that when there are too few Y groups, their provision of antistatic and hydroscopic properties is poor, and when too many component (A) becomes excessively water soluble and its adsorptivity for fibers, etc., declines.

Z is a hydroxyl or alkoxy group, although its presence in (A) is not always necessary. Should it be present, at most an average of 0.2 units per silicon atom is desirable. Alkoxy groups are represented by methoxy, ethoxy, butoxy, and methoxyethoxy groups.

The sum of a+b+c+d, that is, of the R group, X group, Y group, and Z group, is in the range of 1.90 to 2.20, on the average, with respect to each silicon atom.

The molecular shape of this organopolysiloxane may be a straight chain, branched chain, ring, or a block copolymer of organopolysiloxane and polyoxyalkylene blocks. The R groups, X groups, and Y groups may either be present on the ends of the organopolysiloxane chains, or as side chains, or as both, and the same is true for the Z group, although generally it is present at the ends of the molecular chains.

The viscosity of this organopolysiloxane is not particularly restricted, but when the viscosity at 25° C. is less than 10 cst, its effectiveness in providing smoothness and softness is not very significant, and when it exceeds 500,000 cst, it becomes difficult to emulsify. Therefore, a viscosity of 10 to 500,000 cst is preferable.

This organopolysiloxane can be easily prepared by well-known methods such as the method of bringing into equilibrium an organopolysiloxane containing an R and X group and an organopolysiloxane containing an R and Y group, in the presence of an alkali catalyst; the method of reacting ammonia or alkylamines with an organopolysiloxane containing R groups, one or more Y groups, and one or more monohalogenated alkyl groups; or the method of condensation reaction between a dialkoxysilane containing an R group and an X group with a dialkoxysilane containing an R group and a Y group in a hydroxyl endblocked diorganopolysiloxane.

The surfactant component (B) used in the present invention is a component which is necessary in order to emulsify component (A) when its water solubility is inadequate. It is represented by such nonionic surfactants as polyoxyalkylene alkyl esters, polyoxyalkylene alkylphenol ethers, polyoxyalkylene alkyl esters, sorbitan alkyl esters, polyoxyalkylenesorbitan alkyl esters, and by cationic surfactants such as aliphatic amine salts, quaternary ammonium salts, alkyl pyridinium salts, etc. One or more varieties of these may be used. Other surfactants, for example anionic surfactants and amphoteric surfactants, cannot be used for the present invention because they react with the amino group contained in component (A) in such a way that it does not emulsify, or if it does emulsify, it separates immediately.

The amount of component (B) added is that necessary to emulsify component (A). When the water solubility of component (A) is adequate, the addition of (B) is unnecessary. When the water solubility of (A) is inadequate, normally 1 to 100 parts by weight of (B), with respect to 100 parts by weight of component (A), of (B) must be used.

The organic esters of titanic, zirconic or germanic acid (C) used in the compositions of the present invention is an important component for the purpose of permitting component (A), which has been dissolved or emulsified in water, to be adsorbed onto the fiber or other material being treated when the pH of the composition is adjusted to within the specified range with component (D). If either component (C) or component (D) is lacking, adsorption markedly declines. Examples of component (C) are tetraethyl titanate, tetraisopropyl titanate, tetra-n-butyl titanate, tetra-2-ethylhexyl titanate, tetraphenyl titanate, tetraoctadecyl titanate, tetrastearyl titanate, diisopropoxybisacetylacetone titanate, tri-n-butoxymonostearyl titanate, tetraoctylene glycol titanate, dihydroxybislactic acid titanate

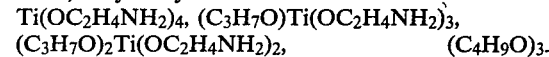
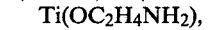
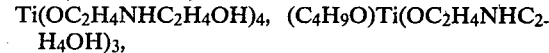
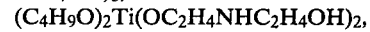
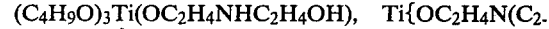
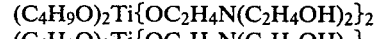
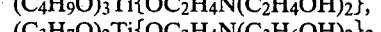

Ti(OC$_2$H$_4$NH$_2$)$_4$, (C$_3$H$_7$O)Ti(OC$_2$H$_4$NH$_2$)$_3$, (C$_3$H$_7$O)$_2$Ti(OC$_2$H$_4$NH$_2$)$_2$, (C$_4$H$_9$O)$_3$Ti(OC$_2$H$_4$NH$_2$), Ti(OC$_2$H$_4$NHC$_2$H$_4$OH)$_4$, (C$_4$H$_9$O)Ti(OC$_2$H$_4$NHC$_2$H$_4$OH)$_3$, (C$_4$H$_9$O)$_2$Ti(OC$_2$H$_4$NHC$_2$H$_4$OH)$_2$, (C$_4$H$_9$O)$_3$Ti(OC$_2$H$_4$NHC$_2$H$_4$OH), Ti{OC$_2$H$_4$N(C$_2$H$_4$OH)$_2$}$_4$, (C$_4$H$_9$O)Ti{OC$_2$H$_4$N(C$_2$H$_4$OH)$_2$}$_3$, (C$_4$H$_9$O)$_2$Ti{OC$_2$H$_4$N(C$_2$H$_4$OH)$_2$}$_2$, (C$_4$H$_9$O)$_3$Ti{OC$_2$H$_4$N(C$_2$H$_4$OH)$_2$}, (C$_3$H$_7$O)$_2$Ti{OC$_2$H$_4$N(C$_3$H$_6$OH)$_2$}$_2$,

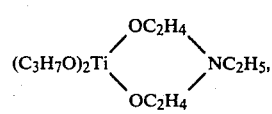

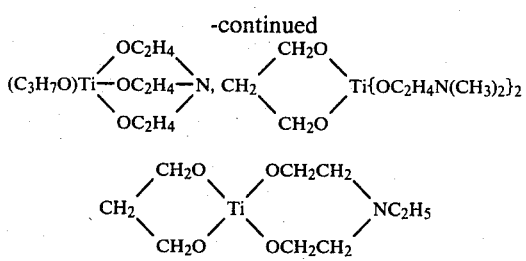

and partially hydrolyzed condensates thereof, and compounds in which zirconium or germanium is substituted in the place of titanium in the above-mentioned compounds, as well as partially hydrolyzed condensation products thereof. One variety of component (C) can be used alone, or two or more varieties may be used together.

Component (C) causes the adsorption of component (A) onto the fiber or other material being treated when the pH of the composition has been adjusted to within the specified range with component (D). When the rate of adsorption is either too fast or too slow, the treatment becomes difficult, so a particularly desirable compound for component (C) is an organic ester of titanic acid which has at least one aminoalkoxy group per molecule.

When the amount of component (C) added is too small, component (A) is not adsorbed, and when excessive, it hinders the adsorption of component (A). Therefore, the amount added is 0.1 to 50 parts by weight, and preferably 1 to 20 parts by weight, with respect to 100 parts by weight of component (A).

The acid component (D) of the compositions of the present invention, is an essential component for the purpose of causing component (A), which has been dissolved or emulsified in water, to be adsorbed onto the material receiving treatment by the action of component (C) by adjusting the pH of the composition to within the specified range of from 2.5 to 7.0, both inclusive. It may be an organic acid or an inorganic acid. Examples of suitable organic acids are aliphatic saturated monocarboxylic acids such as formic acid, acetic acid, propionic acid, caproic acid and capric acid; aliphatic saturated dicarboxylic acids such as malonic acid, succinic acid, and glutaric acid; unsaturated aliphatic carboxylic acids such as maleic acid, fumaric acid, acrylic acid and butenoic acid; aromatic carboxylic acids such as benzoic acid, and substituted derivatives and salts of these. Examples of suitable inorganic acids are phosphoric acid, pyrophosphoric acid, carbonic acid, hydrochloric acid, and sulfuric acid. One or more varieties of these may be used. An organic acid, particularly a water-soluble saturated aliphatic monocarboxylic acid, is preferable.

The quantity of component (D) added is that required to adjust the pH of the composition formed from components (A) to (E) to a value of from 2.5 to 7.0, both inclusive. When the pH is either too high or too low, the adsorption of component (A) onto the material being treated decreases. The preferred pH range is from 4 to 6.

The water component (E) of the present invention, is for the dilution of component (A), converting the composition into an aqueous solution or emulsion; its quantity is not particularly restricted. Typically the compositions of this invention are more than 50 percent by weight water. For treating textiles by immersion the compositions are preferably more than 90 percent water.

In addition to components (A) to (E), one may also use aminoalkyl-containing organopolysiloxanes, organoalkoxysilanes, organohydrogenpolysiloxanes, buffers to improve the stability of the pH (for example, sodium acetate, magnesium sulfate), compounds of organic metals such as tin, zinc, lead, cobalt, etc., (which are well known as catalysts for condensation reactions), coloring agents such as dyes and pigments, thickening agents such as mica, colloidal silica, polyvinyl alcohols, and other well-known conventional additives such as antistatic agents, softeners, anticrease agents, antimold agents, insecticides and flame retardants.

To produce the composition of the present invention, one should, for example, first mix components (A), (B), and (E), preparing an aqueous solution or aqueous emulsion in advance. Then, immediately prior to use, components (C) and (D), as well as component (E) if needed, should be added into the above-mentioned aqueous solution or aqueous emulsion.

The compositions of the present invention are useful as a treating composition to give crease resistance, softness, and elasticity, without harming the antistatic properties and stain resistance, to various fibers and textiles, as well as to sheet-form base materials such as paper, natural or synthetic leathers, cellophane, plastic film, etc. When these fibers, textiles and sheet-form base materials tend to become electrically charged, as well as being easily stained because they are hydrophobic, the compositions of the present invention also function as an antistatic agent and as a stain-resisting agent.

The compositions of the present invention are also useful as a polish, an antistatic additive, and as a mold releasing agent for synthetic resin molded products, natural or synthetic rubber molded products, metal molded products, glass, etc.

The above-mentioned fibers are represented, in terms of composition, by natural fibers such as wool, silk, flax, cotton, and asbestos; by regenerated fibers such as rayon and acetate; and by synthetic fibers such as polyesters, polyamides, vinylon, polyacrylonitrile, polyethylene, polypropylene, and spandex; and by glass fibers, carbon fibers, and silicon carbide fibers. Their forms are represented by staple, filaments, tow, and yarn. As textiles, they are represented by knit and woven goods, non-woven cloth, resin-treated cloth, and goods sewn from these.

In treating fibers, textiles and sheet-form base materials, etc., with the composition of the present invention, it should first be immersed in the composition of the present invention, or the composition of the present invention should be sprayed, brushed, or rolled on, with the water then shaken off.

The above-mentioned immersion, spraying, and application by brush or by roller can be carried out at normal temperatures, or can be carried out with heating. In an immersion process the adsorptivity of component (A) toward the fiber and sheet-form base material increases when the composition of the present invention is heated to a temperature above the clouding point of component (A). The period of immersion at normal temperatures is usually 10 to 120 minutes, but when heated, this period may be shortened. Also, after immersion, spraying, or application by a brush or roller, the amount of the composition of the present invention which adheres to the material can be reduced by pressing with a double roller or mangle, and then the water content can be removed. The removal of the water content may be carried out at normal temperatures, but is preferable to carry it out with heating, e.g., at 100° to 200° C., because the adsorptivity of component (A) and the effects of the treatment improve.

Component (A) of the composition of the present invention is easily adsorbed onto the materials being treated, such as fibers, textiles and sheet-form base materials. Particularly when an organic titanic acid ester which has at least one aminoalkoxy group in each molecule as component (C) is used, absorption is extremely easy yielding the added advantage that the treatment of the waste solution is unnecessary or else is a very simple matter.

Fibers, textiles and sheet-form base materials treated with the composition of the present invention do not lose their antistatic properties or stain resistance, and yet have strikingly improved crease resistance, softness, and elasticity, which does not readily diminish even if repeatedly laundered or dry cleaned. When the fibers, textiles and sheet-form base materials tend to become electrically charged and/or easily stained because they are hydrophobic, their antistatic properties and stain resistance are improved, showing an excellent durability.

Synthetic resin molded products, natural or synthetic rubber molded products, metal molded products, glass, etc., which are treated with the composition of the present invention, have excellent mold releasing characteristics, antistatic properties, and luster.

The following examples are disclosed to further illustrated, but not to limit, the present invention which is properly delineated by the claims appended hereto.

In each of the examples, "parts" and "%" mean "parts by weight" and "wt%", respectively. Viscosity is the value obtained at 25° C. Me denotes the methyl radical. Moreover, the determinations of the properties of the fabric conform to the following evaluation methods.

Softness: judged according to the sensation when touched with the hands.

Elasticity: each end of the cloth was grasped with the hands and slowly stretch and allowed to return to its former shape repeatedly; the elastic uniformity was evaluated by sensory examination.

Crease Resistance: conducted according to Method B (Monsanto Method) of the dry, non-pretreated situation of 6.22 Crease Resistance of "Ordinary Fabrics Test Method" JIS L-1096 (1979).

Frictional Charge: the frictional charge was measured using the Kyoto University Chemical Lab rotary static tester with cotton cloth (unbleached muslin No. 3) as the object of friction after 60 seconds of rotation at a speed of 800 rpm.

Stain Resistance: expressed as reflectivity by artificially staining a cloth and measuring the reflectance of light. An artificial staining composition was prepared by thoroughly pulverizing in a mortar and mixing ASTM No. 1 oil (300 g), coal tar (3 g), dry clay powder (5 g), Portland cement (5 g), and sodium dodecylbenzene sulfonate (5 g). The above-mentioned artificial staining composition (5 cc), a 0.5 wt% of an aqueous solution of Marcel soap (100 cc), the test cloth (5 cm×10 cm), and ten steel balls were placed in a glass bottle as stipulated by the "Color Fastness Test Method for Laundering" JIS L-0844 (1973) and sealed. After the test cloth was removed from the glass bottle and lightly rinsed, it was placed in an automatic spin reversing electric washing machine containing a 0.5 wt% aqueous solution of Marcel soap, and was washed for 10 minutes on the strong cycle. The washing machine was set as stipulated in the above-mentioned JIS and operated for 30 minutes at 60° C. The test cloth was removed and dried, and the reflectivity of light having a wavelength of 550 m$\mu$m was measured using a reflectometer.

Adsorptivity of the organopolysiloxane: The treatment solution (0.025 ml) was collected in a cuvette for liquids, set in an X-ray fluorescence apparatus, and the amount of the silicon was determined and converted to the corresponding quantity of organopolysiloxane. The adsorptivity was calculated from the difference in the amount of organopolysiloxane in the treatment solution before and after treatment.

Bulkiness: evaluated according to sensation when grasping the material with the hand.

Slipperiness: evaluated according to sensation when picking up the material with the fingertips.

EXAMPLE 1

An apparently uniform starting emulsion was prepared by mixing an organopolysiloxane, expressed by the formula $$Me_3SiO(Me_2SiO)_{96.5}(MeYSiO)_{1.5}(MeXSiO)_2SiMe_3$$

wherein Y is $-CH_2CH_2CH_2O(C_2H_4O)_{10}H$ and X is $-CH_2CH_2CH_2NHCH_2CH_2NH_2$ and having a viscosity of 450 cst as component (A) (30 parts), a mixture of three polyoxyethylenenonyl phenyl ethers with differing HLB values as component (B) (3 parts), and water as component (E) (67 parts). This starting emulsion (5 parts) was diluted with water (2000 parts), and after di-n-butoxybis(triethanolamine)titanate (0.15 parts) was added as component (C), various amounts of acetic acid added as component (D), to provide 7 treatment compositions having various pH values, as shown in Table I. Knit fabrics made of polyester treated yarn, which had been given a fluorescent whitening treatment (100 parts) were immersed in these treatment compositions and left for 60 minutes at room temperature. After the pieces of fabric were removed and thoroughly pressed, they were dried with hot air for 10 minutes at 105° C. Observations of the state of the treatment composition before and after treatment, and measurements of the adsorptivity of the organopolysiloxane and the properties of the knit fabrics were then carried out. These results are shown in Table I (Test Sample Nos. 2–8).

As a Comparison Example Test Sample No. 6 was prepared except without the di-n-butoxybis(triethanolamine)titanate. The treatment of the knit fabric made of polyester treated yarn which had been treated by fluorescent whitening was carried out in the same manner as described above (Test Sample No. 9), and the observations and measurements were likewise carried out in the same manner. Those results are shown in Table I, along with the results of the measurements of the above-mentioned untreated knit fabric. From these data it can be seen that Test Samples 3 to 7 represent compositions of this invention.

TABLE I

| Test Sample No. | Category | pH | Appearance of the treatment solution Before treatment | Appearance of the treatment solution After treatment | Adsorptivity (%) | Properties of the knit fabric Softness | Properties of the knit fabric Elasticity | Frictional charge (V) | Reflectivity (%) |
|---|---|---|---|---|---|---|---|---|---|
| 1 | Comparison Example | | Without treatment | | | Poor | Poor | 2990 | 56 |
| 2 | Comparison Example | 2 | Cloudy | Slightly cloudy | 20 | Rather poor | Rather poor | 2730 | 62 |
| 3 | Example | 3 | Cloudy | Faintly cloudy | 54 | Good | Good | 2330 | 69 |
| 4 | Example | 4 | Cloudy | Virtually transparent | 85 | Extremely good | Extremely good | 2110 | 73 |
| 5 | Example | 5 | Cloudy | Virtually transparent | 88 | Extremely good | Extremely good | 1950 | 77 |
| 6 | Example | 6 | Cloudy | Virtually transparent | 89 | Extremely good | Extremely good | 1920 | 76 |
| 7 | Example | 7 | Cloudy | Faintly cloudy | 54 | Good | Good | 2250 | 70 |
| 8 | Comparison Example | 8 | Cloudy | Slightly cloudy | 21 | Rather poor | Rather poor | 2670 | 61 |
| 9 | Comparison Example | 6 | Cloudy | Cloudy | 5 | Poor | Poor | 3040 | 53 |

EXAMPLE 2

Hydroxyl endblocked dimethylpolysiloxane with a viscosity of 80 cst (100 parts), silane having the formula $CH_3(CH_3O)_2Si(CH_2)_3NH_2$ (3.6 parts), silane having the formula $CH_3(CH_3O)_2Si(CH_2)_3OH$ (3.0 parts), and potassium hydroxide (0.08 parts) were placed in a 3-neck flask and stirred for three hours at 130° C. under reflux. A straw-colored methylpolysiloxane having a viscosity of 650 cst and containing aminopropyl groups, hydroxypropyl groups, and alkoxy groups was obtained. A starting emulsion was prepared from this methylpolysiloxane according to the same procedure as described in Example 1. This starting emulsion (3 parts) was diluted with water (2000 parts). After di-n-butoxybis(triethanolamine)titanate (0.1 parts) was dissolved therein, the pH of the composition was adjusted to a value of 5 by the addition of malonic acid. A 100% cotton knit fabric (100 parts) was immersed in the resulting composition and left for 120 minutes at room temperature. After the fabric was removed and thoroughly pressed, it was dried with hot air for 2 minutes at 150° C. (Test Sample No. 10). The treatment solution was cloudy before the treatment, but was virtually transparent afterwards. The adsorptivity of the methylpolysiloxane toward the knit fabric was 75%.

As Comparison Examples, a faintly yellow, transparent methylpolysiloxane containing aminopropyl groups and terminal alkoxy groups with a viscosity of about 660 cst was prepared by mixing hydroxyl endblocked dimethylpolysiloxane with a viscosity of 80 cst (103 parts), silane having the formula $CH_3(CH_3O)_2Si(CH_2)_3NH_2$ (3.6 parts), and potassium hydroxide (0.08 parts), and reacting this mixture for 3 hours at 130° C. A treatment solution was prepared from this methylpolysiloxane under exactly the same conditions as described above, and a 100% cotton knit fabric was treated under exactly the same conditions as described above (Test Sample No. 11). The treatment solution was cloudy prior to the treatment, but was virtually transparent afterwards. The adsorptivity of the methylpolysiloxane was 78%. The properties of the untreated knit cloth (Test Sample No. 12), Test Sample No. 10, and Test Sample No. 11 were evaluated, and the results are shown in Table II.

TABLE II

| Test Sample No. | Category | Softness | Elasticity | Frictional Charge (V) | Reflectivity (%) |
|---|---|---|---|---|---|
| 10 | Example | Good | Good | 930 | 73 |
| 11 | Comparison Example | Good | Good | 1180 | 62 |
| 12 | Comparison Example | Poor | Poor | 1010 | 65 |

EXAMPLE 3

The starting emulsion of Example 1 (4 parts) was diluted with water (2000 parts), and di-n-propoxybis(diethanolamine)titanate (0.1 parts) was dissolved therein. Then the pH was adjusted to 5.5 by the addition of propionic acid. A mixed broadcloth of spun polyester/cotton (65/35) was immersed in this composition and left for 60 minutes while the temperature was increased to 55° C. The broadcloth was then removed and dried for 10 minutes at 105° C. (Test Sample No. 13). The adsorptivity of the organopolysiloxane relative to this broadcloth was 69%.

As a Comparison Example, a treatment composition was prepared according to the same procedure as described above using the methylpolysiloxane containing aminopropyl groups and terminal alkoxy groups that was prepared as a Comparison Example in Example 2, and a mixed broadcloth of spun polyester/cotton (65/35) was treated according to the same procedure as described above (Test Sample No. 14).

The properties of the untreated broadcloth (Test Sample No. 15), Test Sample No. 13, and Test Sample No. 14 were measured, and the results are shown in Table III.

TABLE III

| Test Sample No. | Category | Softness | Slippery Sensation | Frictional Charge (V) | Crease Resistance (%) |
|---|---|---|---|---|---|
| 13 | Example | Good | Great | 1320 | 85 |
| 14 | Comparison Example | Good | Great | 1660 | 80 |
| 15 | Comparison | Poor | Almost None | 1350 | 71 |

TABLE III-continued

| Test Sample No. | Category | Softness | Slippery Sensation | Frictional Charge (V) | Crease Resistance (%) |
|---|---|---|---|---|---|
| | Example | | | | |

EXAMPLE 4

A faintly yellow, transparent methylpolysiloxane with a viscosity of about 35,000 cst and containing aminopropyl groups, polyoxyethylene and polyoxypropylene modified propyl groups, and terminal alkoxy groups was prepared by mixing hydroxyl endblocked dimethylpolysiloxane with a viscosity of 800 cst (100 parts), silane having the formula $(CH_3O)_3Si(CH_2)_3NH_2$ (3.7 parts), silane having the formula

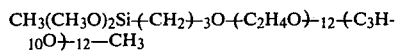

$CH_3(CH_3O)_2Si(CH_2)_3O(C_2H_4O)_{12}(C_3H_{10}O)_{12}$—$CH_3$ (15.3 parts), and potassium hydroxide (0.08 parts), and then reacting this mixture for 3 hours at 130° C. An initial emulsion was prepared under exactly identical conditions as those described in Example 1 only using the methylpolysiloxane discussed immediately above as the starting material. A treatment composition was prepared using this starting emulsion, and a knit fabric made of polyester processed yarn which had been treated by fluorescent whitening was treated, and measurements of the properties of the knit fabric were carried out (Test Sample No. 16). The results are shown in Table IV, along with the results of the measurements of the properties of the untreated knit fabric.

TABLE IV

| Test Sample No. | Category | Softness | Elasticity | Frictional Charge (V) | Reflectivity (%) | Bulkiness |
|---|---|---|---|---|---|---|
| 16 | Example | Good | Good | 2030 | 76 | Good |
| 1 | Comparison Example | Poor | Poor | 2990 | 56 | Poor |

That which is claimed is:

1. A composition obtained by mixing components comprising
   (A) 100 parts by weight of an organopolysiloxane component having the formula $R_aX_bY_cZ_dSiO_{(4-a-b-c-d)/2}$ wherein R denotes a monovalent hydrocarbon group; X denotes a group having the formula $—R^1(NHCH_2CH_2)_eNR_2^2$, wherein $R^1$ denotes a divalent hydrocarbon group, $R^2$ denotes a hydrogen atom or a monovalent hydrocarbon group and e is an integer from 0 to 3; Y denotes a group having the formula $—R^3OH$ or $—R_f^3O(C_mH_{2m}O)_gR^4$ wherein $R^3$ denotes a divalent hydrocarbon group, $R^4$ denotes a hydrogen atom or a terminating group, f is 0 or 1, g has a value of from 1 to 100 and m is an integer from 1 to 5; Z denotes a hydroxyl group or an alkoxy group; a has a value of from 1.90 to 2.20; b has a value of from 0.0001 to 0.2; c has a value of from 0.0001 to 0.2; d has a value of from 0 to 0.2 and the sum of a+b+c+d has a value of from about 1.90 to 2.20,
   (B) 0 to 100 parts by weight of a nonionic or a cationic surfactant,
   (C) 0.1 to 50 parts by weight of an organic ester of titanic, zirconic or germanic acid,
   (D) an amount of acid sufficient to provide a pH of from 2.5 to 7.0 for the composition, and
   (E) an amount of water effective to emulsify or dissolve component (A).

2. A composition according to claim 1 wherein the organopolysiloxane component (A) has a viscosity at 25° C. of from 10 to 500,000 centistokes.

3. A composition according to claim 1 wherein b has a value of from 0.001 to 0.05.

4. A composition according to claim 1 wherein c has a value of from 0.001 to 0.1.

5. A composition according to claims 1, 2, 3 or 4 wherein at least 50 percent of all R groups are the methyl group.

6. A composition according to claims 1, 2, 3 or 4 wherein component (C) is an organic ester of titanic acid which has at least one aminoalkoxy group in each molecule and component (D) is an organic acid.

* * * * *